US008621499B2

(12) United States Patent
Charania et al.

(10) Patent No.: US 8,621,499 B2
(45) Date of Patent: Dec. 31, 2013

(54) CONTENT RECOMMENDATION USING SUBSEQUENCE PROFILING

(75) Inventors: Aamer Charania, Flower Mound, TX (US); Yuriy Bolyukh, Trophy Club, TX (US); Sergiy Panchishniy, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 151 days.

(21) Appl. No.: 13/213,192

(22) Filed: Aug. 19, 2011

(65) Prior Publication Data

US 2013/0047176 A1 Feb. 21, 2013

(51) Int. Cl.
*H04H 60/32* (2008.01)
*G06F 3/00* (2006.01)
*G06F 13/00* (2006.01)

(52) U.S. Cl.
USPC .................. 725/14; 725/19; 725/46

(58) Field of Classification Search
USPC ........ 725/9, 11, 12, 14, 32, 35, 37, 39, 46, 58
See application file for complete search history.

(56) References Cited

U.S. PATENT DOCUMENTS

| 7,853,600 | B2* | 12/2010 | Herz et al. | 725/46 |
| 2002/0056087 | A1* | 5/2002 | Berezowski et al. | 725/9 |
| 2003/0020744 | A1* | 1/2003 | Ellis et al. | 345/723 |

* cited by examiner

*Primary Examiner* — Hai V Tran

(57) ABSTRACT

A method includes identifying at least one program viewing sequence. The at least one program viewing sequence includes a plurality of programs. The method may include identifying a subsequence in the at least one program viewing sequence. The subsequence includes a subset of the plurality of programs in the at least one program viewing sequence and the subset of the plurality of programs is arranged in an identified order. The method may further include determining a user profile based on the subsequence. The method may include receiving a current viewing indicator. In addition, the method may include determining whether the current viewing indicator indicates the subsequence. The method may also include providing a content recommendation based on the user profile for the subsequence in response to a determination that the current viewing indicator indicates the subsequence.

20 Claims, 7 Drawing Sheets

CONTENT RECOMMENDATION USING SUBSEQUENCE PROFILING

BACKGROUND INFORMATION

Television viewers have access to an ever-growing amount and variety of content. For example, a viewer may choose between pay-per-view programs, on-demand programs, interactive games, music, broadcast television programs, etc. Viewers watching a television (TV) interact with the TV through TV commands, which are wired or wireless commands. TV commands are typically communicated to the TV through a sequence of button press events on a remote control device that provides a signal(s) for the television and/or a set top box associated with the TV. Examples of TV commands include changing a channel, adjusting volume, muting the television, turning on closed captioning, and recording a program, etc.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments disclosed herein relate to devices, methods, and systems for identifying occurrences of a subsequence in at least one program viewing sequence. Consistent with the embodiments described herein, a user profile may be determined based on the subsequence. A current viewing indicator may be received and a determination may be made regarding whether the current viewing indicator indicates a recurrence of the subsequence. A content recommendation may be provided based on the user profile in response to an indication of a recurrence of the subsequence.

In addition, embodiments described herein relate to devices, methods, and systems for providing weighted recommendations. Consistent with the embodiments described herein, multiple recommendation sets may be determined and weighting factors may be assigned to each of the multiple recommendation sets. Weighting factors for the recommendation sets may be refined based upon a response to each recommendation.

Figure 1A:
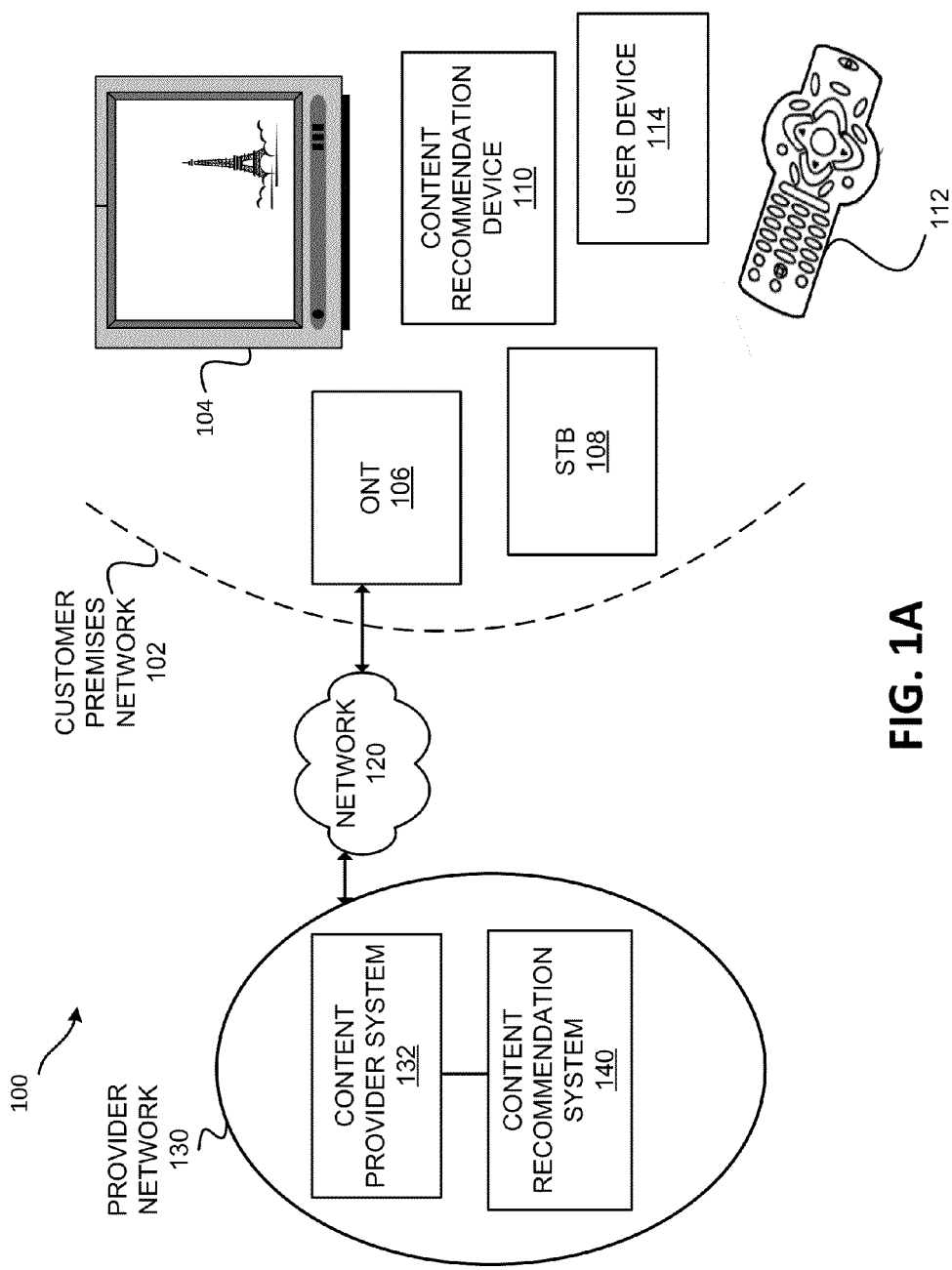
FIG. 1A illustrates an exemplary network in which systems and methods described herein may be implemented.

FIG. 1A is a diagram of an exemplary network 100 in which systems and/or methods described herein may be implemented. As illustrated, network 100 may include a customer premises network 102, and a provider network 130. Customer premises network 102 (e.g., the customer's home) may include a TV 104, an optical network terminal (ONT) 106, a set-top box (STB) 108, a content recommendation device 110, a remote control 112, and a user device 114. User device 114 may be a computer, phone, tablet, etc., implemented in customer premises network 102. Provider network 130 may include a content provider system 132, and a content recommendation system 140. Customer premises network 102 and provider network 130 may be interconnected by network 120. Other devices may be connected to network 120 and provider network 130 independent of customer premises network 102, such as a mobile phone, etc. Components of network 100 may be interconnected via wired and/or wireless connections. The configuration of components of network 100 illustrated in FIG. 1A is for illustrative purposes only. Other configurations may be implemented. Therefore, network 100 may include additional, fewer and/or different components than those depicted in FIG. 1A. Also, in some instances, one or more of the components of network 100 may perform one or more functions described as being performed by another one or more of the components of network 100.

ONT 106 may receive data, e.g., on a fiber optic cable, and may transfer the data to the appropriate device in customer premises network 102, such as STB 108. Likewise, ONT 106 may receive data from any device in customer premises network 102 and may transmit the data to other devices in customer premises network 102, e.g., through a fiber optic cable. ONT 106 may provide customer premises network 102 with television access, Internet access, or telephone service, for example. Additionally, ONT 106 may output data to provider network 130 through network 120.

STB 108 may receive content and output the content to TV 104 for display. STB 108 may include a component (e.g., a cable card or a software application) that plugs into a host device (e.g., a personal computer, TV 104, a stereo system, etc.) that allows the host device to display content. STB 108 may also be implemented as a home theater personal computer (HTPC), an optical disk player (e.g., digital video disk (DVD) or Blu-Ray™ disc player), a cable card, etc. STB 108 may receive commands from other devices in network 100, such as remote control 112. In one embodiment, STB 108 may include a microphone and/or a camera.

TV 104 may include speakers as well as a display. TV 104 may play content, for example, received from STB 108. While some embodiments described below may use TV 104 to view content, other embodiments may use any device (e.g., a computer or a mobile phone) to display/provide content.

Remote control 112 may issue TV commands for controlling other electronic devices, such as TV 104 or STB 108. Remote control 112, in conjunction with STB 108, may allow a user to interact with an application running on STB 108. In some instances, other types of devices (e.g., a keyboard, mouse, mobile phone, etc.) may be used instead of remote control 112.

Content recommendation device 110 may receive TV commands, for instance from remote control 112. Content recommendation device 110 may provide content recommendations for TV 104, in conjunction with content recommendation system 140 and/or STB 108, as described below. Content recommendation device 110 may be software, hardware, or a combination of hardware and software. According to an embodiment, content recommendation device 110 may be a component of a set top box, such as STB 108 described above. Alternately, device 110 may be implemented as part of TV 104, for example, as a dongle that is operably connected to STB 108, etc. In another embodiment, device 110 may be implemented as a component of a remote control, such as a component of remote control 112, or as part of content recommendation system 140.

Network 120 may include a wired or wireless network. Network 120 may include a wireless public land mobile network (PLMN) (e.g., a cellular network). The PLMN may include a Code Division Multiple Access (CDMA) 2000 PLMN, a Global System for Mobile Communications (GSM) PLMN, a Long Term Evolution (LTE) PLMN and/or other type of PLMN. In addition to a wireless network, network 120 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 120 may also include a wireless satellite network.

Content provider system 132 may include one or more servers and one or more memory/storage devices. Content provider system 132 may provide media content, such as movies, broadcast programs, music videos, advertisements, etc., to customer premises network 102. Additionally, content provider system 132 may provide metadata associated with the media content. According to one embodiment, content provider system 132 provides scheduled media content on a subscription and/or pay per view basis.

Provider network 130 may include systems that provide support and management services for network 100 including billing, authentication, authorization, networking, configuration, etc. The support and management services may be applied to (and/or through) components of network 130, components of network 120, components of customer premises network 102, and interactions among the various components, etc. In addition, provider network 130 includes systems, such as content recommendation system 140 that may recommend and provide content and advertisements for customer premises networks 102, STBs 108, associated user devices 114 and other user devices. Content recommendation system 140 may operate in conjunction with content provider system 132, and content recommendation devices 110.

Figure 1B:
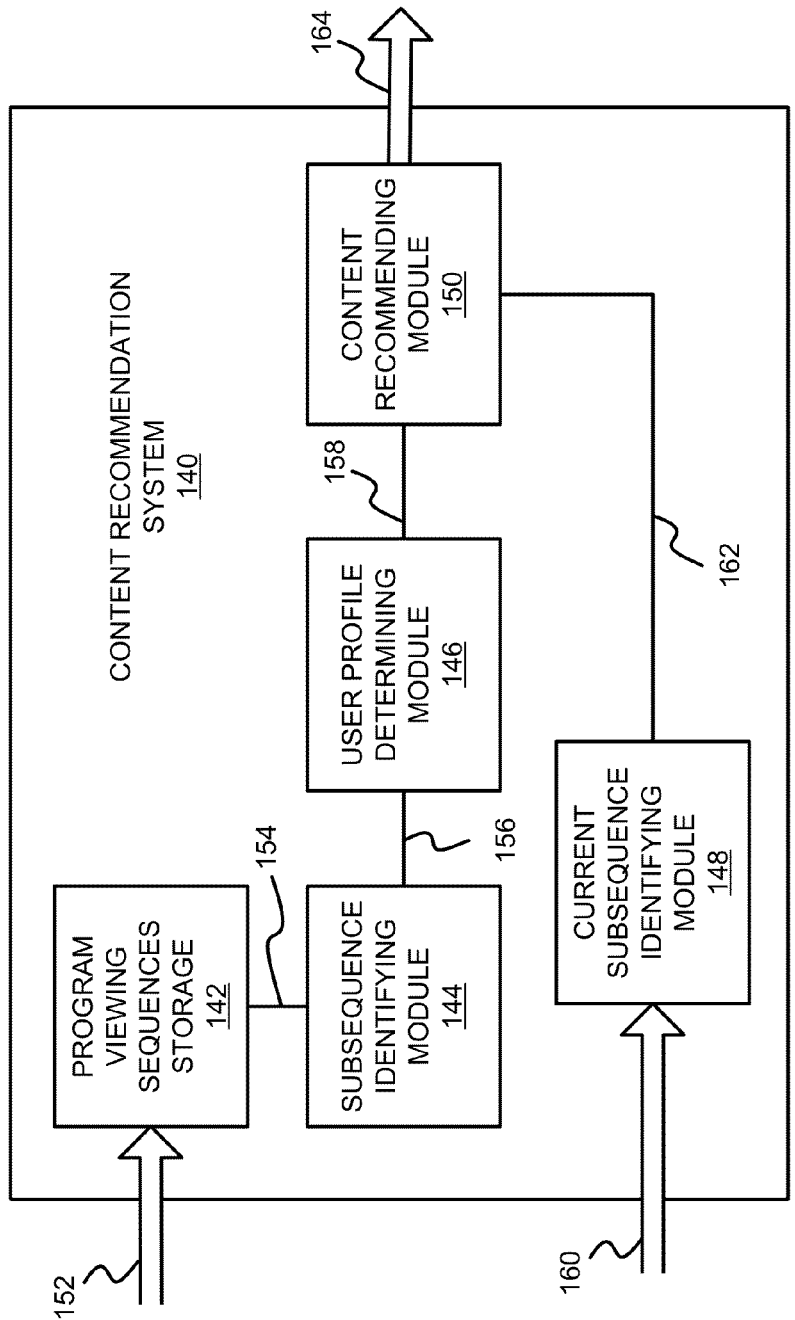
FIG. 1B is a functional block diagram of an exemplary content recommendation system.

FIG. 1B illustrates an exemplary functional block diagram of content recommendation system 140. Content recommendation system 140 includes a program viewing sequences storage 142, a subsequence identifying module 144, a user profile determining module 146, a current subsequence identifying module 148 and a content recommending module 150. The configuration of components of system 140 illustrated in FIG. 1B is for illustrative purposes only. Other configurations may be implemented. Therefore, system 140 may include additional, fewer and/or different components than those depicted in FIG. 1B. FIG. 1B is discussed in conjunction with FIG. 1C and FIG. 1D, which illustrate exemplary program viewing sequences 152a-152n and an exemplary content recommendation message 174, respectively.

Figure 1C:
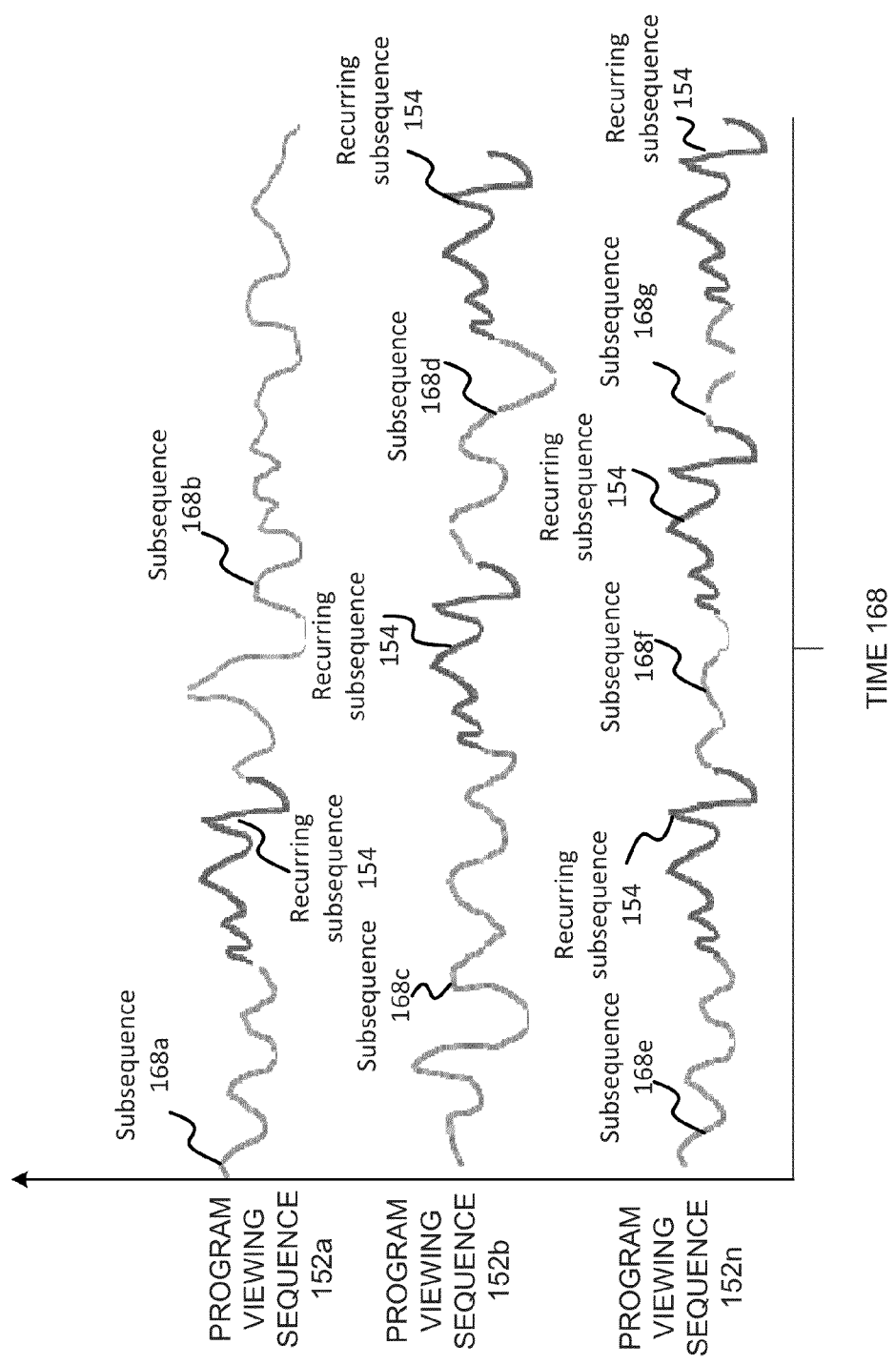
FIG. 1C is a diagram of an exemplary embodiment of a plurality of program viewing sequences.

Referring to FIG. 1B, program viewing sequences storage 142 may store one or more program viewing sequences, such as program viewing sequences 152a-152n shown in FIG. 1C. Additionally, program viewing sequences 152a-152n may be stored for a plurality of customer premises networks 102, and user devices, such as TV 104 and/or computers, mobile phones, etc., that may receive program viewing sequences 152a-152n. Program viewing sequences 152a-152n may be received from one or more STBs 108 and/or other user devices associated with one or more customer premises networks 102 and/or customer accounts.

As shown in FIG. 1C, each of program viewing sequences 152a-152n may represent a television viewing session that includes multiple programs provided/broadcast and/or stored in an order of broadcast time. For instance, a program viewing sequence 152 may represent a first program followed by a second program followed by a third program, etc. Alternatively, program viewing sequence 152 may represent a group of programs in a non-specific order. Each program in program viewing sequences 152a-152n may be defined by at least one vector, such as a broadcast time, genre, program type (i.e., movies, news segment, and music videos), program personnel (i.e., actors, directors, producers, anchors, newscasters, and performers), channel, or broadcast network, date of release, etc. Horizontal axis (time 106) represents an independent temporal progression of programs for each of program viewing sequences 152a-152n. In other words, program viewing sequences 152a-152n may be independent of each other. The configuration of program viewing sequences 152a-152n illustrated in FIG. 1C is for illustrative purposes only. Other configurations may be implemented. Therefore, program viewing sequences 152a-152n may include additional, fewer and/or different sequences than those depicted in FIG. 1C.

According to an embodiment, program viewing sequences 152a-152n may be implemented on a single user device, for instance TV 104 or STB 108. In this case, each of program viewing sequences 152a-152n may represent consecutive or non-consecutive television viewing sessions on TV 104 or STB 108. According to another embodiment, program viewing sequences 152a-152n may be implemented on multiple user devices. In this case, each program viewing sequence 152 may represent a simultaneous television viewing sessions on a different user device. Further, each program viewing sequence 152 may be a television viewing session that includes viewing subsequences for multiple different television viewers that have overlapping viewing patterns (i.e., a viewing pattern for a family room TV). For example, as illustrated in FIG. 1C, a program viewing sequence 152a may include multiple viewing subsequences, including subsequences 168a, and 168b and recurring subsequence 154. Each of subsequences 168a-168g may represent a different viewing pattern generated by different individuals. By way of illustration, subsequence 168a may represent a viewing pattern subsequence 168a generated by a preteen (illustrated in FIG. 1C as) that may differ from a viewing pattern subsequence 168b generated by a teenager (illustrated in FIG. 1C as viewing pattern 168b), which may differ from a viewing pattern subsequence 168c generated by a forty year old adult (illustrated in FIG. 1C as viewing pattern 168a).

Recurring subsequence 154 may represent a subsequence that is repeated, in some instances in multiple program viewing sequences 152a-152n and in other instances in a single program viewing sequence 152. For example, recurring subsequence 154 may occur for multiple customer premises networks 102 and/or user devices and, in some instances, at different times. Recurring subsequence 154 may represent a sequence of programs that includes a recurring order of programs having common vectors. Alternatively, recurring subsequence 154 may represent a subgroup of programs in program viewing sequences 152a-152n. The subgroup of programs in program viewing sequences 152a-152n may be in a specific or a non-specific order. Recurring subsequence 154 may include programs with vectors that have multiple vectors including broadcast time, event, genre, program type, etc. For instance, recurring subsequence 154 may include a first sports program followed by a second sports program followed by a talk show. Although occurrences of subsequence 154 are shown in each of program viewing sequences 152a-152n, in some instances program viewing sequences 152a-152n may include multiple occurrences of a subsequence 154 while other program viewing sequences 152a-152n may not include recurring subsequence 154.

Subsequence identifying module 144 may access program viewing sequences 152a-152n, for instance by receiving program viewing sequences 152a-152n output from program viewing sequences storage 142. Subsequence identifying module 144 may identify instances of recurrences/occurrences of subsequence 154 in at least one of program viewing sequences 152a-152n. The common vectors identified in subsequence 154 may be determined by an administrator for provider network 130 in order to more accurately target subgroups of customers to increase an effectiveness of advertising and content recommendations. For example, subsequence identifying module 144 may identify recurring subsequence 154 based on a pattern of particular common vectors in subsequence 154, such as genre, date of release, etc. Subsequence identifying module 144 may identify recurring subsequence 154 independent of any predefined user profiles and specific time schedules. Additionally, subsequence identifying module 144 may determine a validity of a particular subsequence 154 based on a predetermined threshold frequency of occurrence of recurring subsequence 154 in program viewing sequences 152a-152n. Subsequence identifying module 144 may also determine a validity of a particular subsequence 154 based on an overall number of times of occurrence of recurring subsequence 154 within a defined time, and/or a last occurred instance(s) of recurring subsequence 154, etc.

User profile determining module 146 may receive recurring subsequences 154, for instance from subsequence identifying module 144. User profile determining module 146 may determine a user profile based on recurring subsequence 154. User profile determining module 146 may determine the user profile based on an overlap of different groups and/or demographics for the various programs included in subsequence 154. According to an embodiment, user profile determining module 146 may determine a user profile that corresponds to recurring subsequence 154 based on combined demographic information of television viewers for each identified program in subsequence 154. For instance, user profile determining module 146 may extend aspects of the demographics of one program in subsequence 154 to another program in subsequence 154. In this instance, user profile determining module 146 may target advertisements to a broader sequence of programs based on the demographics of one program in subsequence 154. Alternatively, user profile determining module 146 may determine commonalities of the demographics of the programs in subsequence 154 (i.e., youth in the case of youth oriented programming that includes sports, news, music, etc.) or determine a "fine grain" (i.e., more specific than a general demographic profile determined from one program) demographic profile of a television viewer of subsequence 154 (i.e., an intellectual, sports enthusiast, nature lover). The effectiveness of cross correlations for the user profiles may be refined using survey information for subgroups of television viewers.

According to another embodiment, user profile determining module 146 may determine a user profile corresponding to recurring subsequence 154 based on feedback received from a user device, for instance through content recommendation devices 110. For example, a television viewer may respond to recommendations provided, for instance, by content recommendation module 150 as described below, and user profile determining module 146 may determine/augment a user profile based on the response to the recommendation and subsequence 154.

Current subsequence identifying module 148 may identify a current subsequence from a current viewing indicator 160. Current viewing indicator 160 may comprise a single program or a plurality of programs included in subsequence 154. Current subsequence identifying module 148 may identify when an existing subsequence 154 occurs on a STB and notify server or appropriate recommendation system or device, for instance content recommending module 150. Current subsequence identifying module 148 may determine current viewing indicator 160 to be a sufficient predictor of subsequence 154 for a particular user device, group of user devices, customer premises network 102, or group of customer premises networks 102, based on a probability of an incidence of current viewing indicator 160 indicating a recurrence of subsequence 154. For instance, a first program that is included in subsequence 154 may be followed by a second program that is included in subsequence 154 in 90% of cases. The first program is a sufficient predictor of a subsequence including the first program and the second program at a rate of validity of 90%. For a subsequence 154 that includes three programs, two of the programs may be a sufficient predictor of subsequence 154. This may allow the telecommunications provider to target content to television viewers of subsequence 154 in real time or near real time. Alternatively, current subsequence identifying module 148 may determine an indication of a subsequence 154 upon receiving the entire subsequence 154.

Content recommending module 150 may provide a content recommendation based on the user profile in response to an indication of the recurrence of subsequence 154 received, for instance, from current subsequence identifying module 148. Content recommending module 150 may receive a user profile that corresponds to subsequence 154 from user profile determining module 146. Content recommending module 150 may provide a content recommendation for a user device that has received the current viewing indicator 160 based on the user profile that corresponds to subsequence 154. The content recommendation may be automatically implemented, for instance as a targeted advertisement on TV 104 or via STB 108. Content recommending module 150 may provide media content in conjunction with content provider system 132.

According to an example, current viewing indicator 160 may be a history program. Content recommending module 150 may receive a user profile based on a recurring subsequence 154 that includes a history program followed by a news program followed by a financial planning program. User profile determining module 146 may have determined the demographics of the television viewers of each program in subsequence 154. Content recommending module 150 may determine a targeted advertisement based on the combined demographic information of the television viewers of subsequence 154.

Figure 1D:
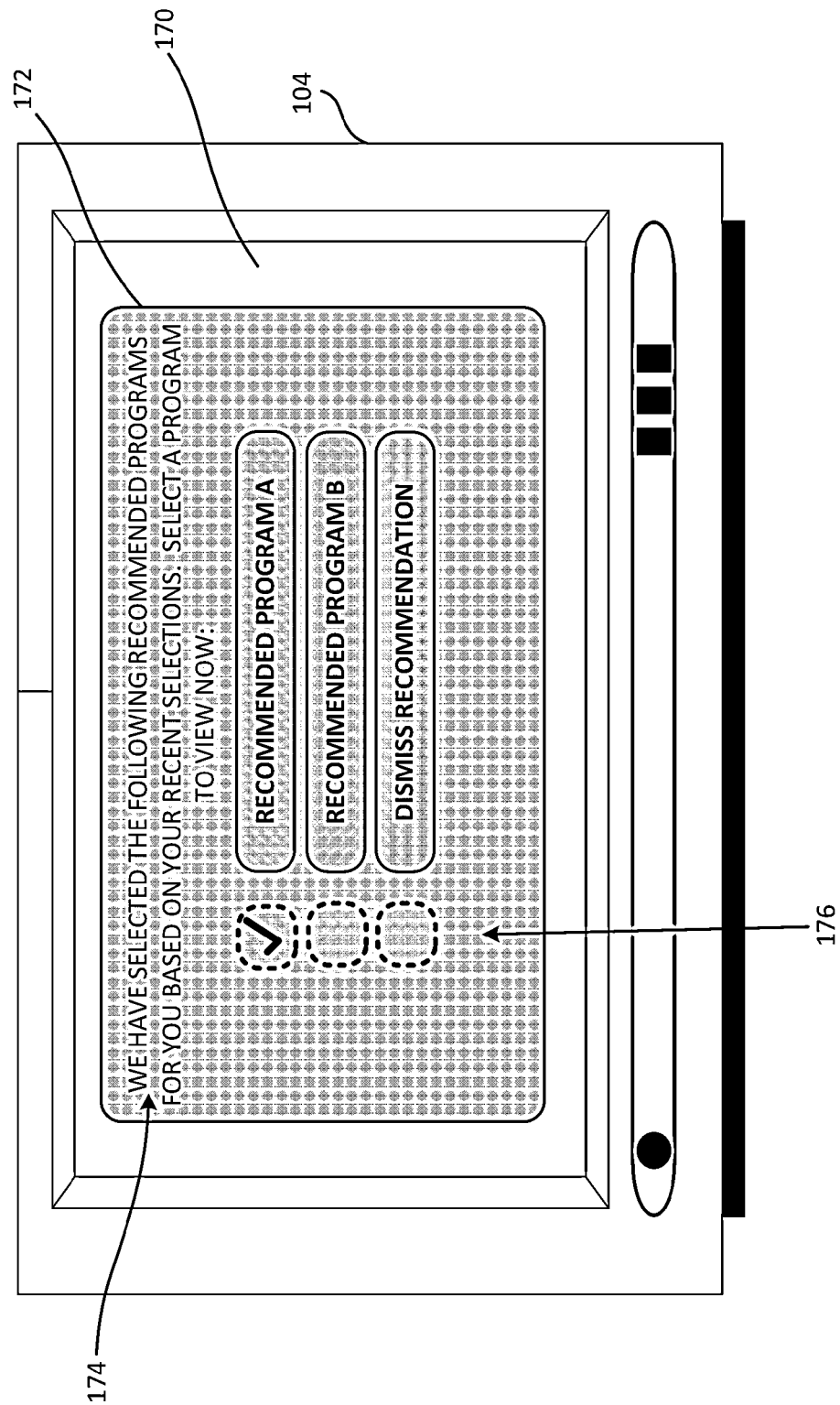
FIG. 1D is a diagram of an overview of an exemplary embodiment of a content recommendation message on a television.

According to an embodiment, as shown in FIG. 1D, content recommending module 150 may provide a content recommendation message 174 to TV 104, such as via STB 108. Content recommendation message 174 may be shown on display 170 of TV 104 in a dialog box 172. Content recommendation message 174 may indicate "we have selected the following recommended programs for you based on your recent selections. Select a program to view now." As shown in FIG. 1D, content recommendation message 174 may provide a plurality of options 176 that a television viewer may select in response to content recommendation message 174.

Figure 2:
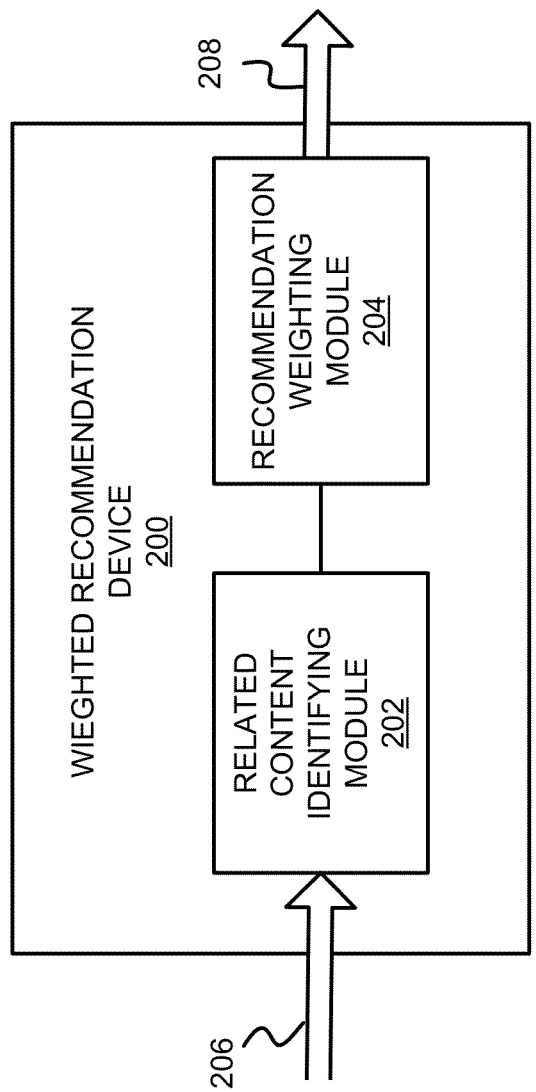
FIG. 2 is a functional block diagram of an exemplary weighted recommendation device.

FIG. 2 illustrates an exemplary functional block diagram of a weighted recommendation device 200. Weighted recommendation device 200 includes a related content identifying module 202 and a recommendation weighting module 204.

The configuration of components of weighted recommendation device 200 illustrated in FIG. 2 is for illustrative purposes only. Other configurations may be implemented. Therefore, device 200 may include additional, fewer and/or different components than those depicted in FIG. 2. Additionally, although weighted recommendation device 200 is described with respect to subsequence 154 and components of network 100 described in FIG. 1A, weighted recommendation device 200 may be used independent of network 100.

Referring to FIG. 2, content recommending module 202 may receive one or more recommendation requests 206. For instance, a user device, such as TV 104 or STB 108, may output recommendation request 206 in response to a television viewer's TV commands meeting a predetermined condition (i.e., the predetermined condition may be that the current subsequence indicator indicates an instance of recurring subsequence 154). Recommendation request 206 may include a user profile associated with the user device. The user profile may have been determined based on a recurring subsequence 154 of programs viewed including a sports channel, an educational channel, etc., that are primarily viewed by television viewers of the identified demographics. The user profile may have been determined as an eighteen to twenty three year old college educated demographic from a particular geographic location that is a sports enthusiast.

Content recommending module 202 may provide multiple recommendation sets for a user device based upon the user profile in response to receiving recommendation request 206. Recommendation sets may be provided as differing content offerings and/or differing advertisements. Recommendation sets may have a single element in some instances (i.e., a recommendation that is a targeted advertisement that can only be shown one at a time) or multiple elements in other instances (i.e., a recommendation that includes multiple movie recommendations). Content recommending module 202 may provide a predetermined number of recommendation sets to weighting module 204 based on available recommendation choices, a threshold validity of each recommendation set and the user profile. The threshold validity of each recommendation set may be determined based on a vector distance of the recommendation set from the user profile. In other words, a recommendation may be eligible to be provided as a recommendation set based on a predefined minimum applicability of the recommendation to the user profile.

Weighting module 204 may receive the multiple recommendation sets and provide a weighting factor with an initial neutral score for each recommendation set. Weighting module 204 may output each of the multiple recommendation sets as a weighted recommendation 208. A particular recommendation set may be selected as weighted recommendation 208 at random for an initial recommendation request 206. Weighting module 204 may adjust the weighting factor for the initial neutral score for each of the multiple recommendation sets based on a response to weighted recommendation 208. The weighting factor for weighted recommendation 208 may be adjusted based upon responses to each weighted recommendation 208. Weighting module 204 may increment or decrement the score for the weighting factor corresponding to each recommendation set after receiving, respectively, a successful response or a failing response to a weighted recommendation 208. Success rate may be determined for programs in instances in which a television viewer chooses content based upon the recommendation within a predetermined time. Further recommendations may be provided in proportion to the weighting factor for each recommendation set.

Weighting recommendation device 200 may be implemented within a provider network for a telecommunications provider, for instance provider network 130. User devices may receive input from television viewers and transmit the input to the provider network. Each device may send input based on TV command activity to the provider network and weighting recommendation device 200. Weighting recommendation device 200 may be implemented as an "add on" that is integrated with the provider network and provides weighted recommendations 208 in conjunction with a recommendation system in the provider network. Alternatively, weighting recommendation device 200 may be implemented as a "stand-alone" (i.e., a device that has no dependencies on other components or devices) device/system. Weighting recommendation device 200 may be device agnostic and/or protocol agnostic and may target/correlate among various user devices having a variety of operating systems, programming languages, and interfaces.

Figure 3:
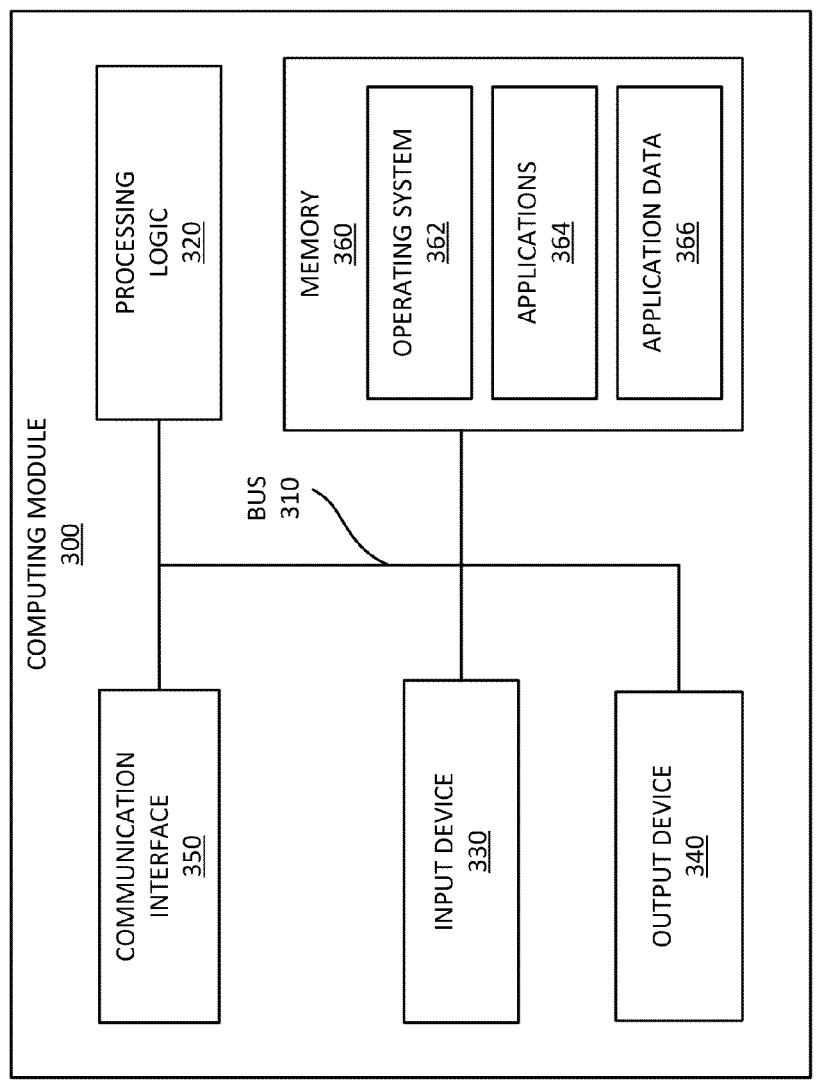
FIG. 3 is a block diagram of exemplary components of one or more of the devices of FIG. 1A.

Devices in network 100 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), a multi-core processor, a reduced-instruction set code (RISC) processor, etc.

Input device 330 may allow a user to input information into computing module 300. Input device 330 may include a keyboard, a mouse, a pen, a microphone, a remote control, an audio capture device, an image and/or video capture device, a touch-screen display, etc. On the other hand, some devices may be managed remotely and may not include input device 330. In other words, some devices may be "headless" and may not include a keyboard, for example.

Output device 340 may output information to the user. Output device 340 may include a display, a speaker, etc. For example, devices may include a liquid-crystal display (LCD) for displaying information to the user, such as a channel and a feature recommendation message 108.

Input device 330 and output device 340 may allow a user to activate and interact with a particular service or application, such as a close captioning application. Input device 330 and output device 340 may allow a user to receive and view a menu of options and select from the menu options. The menu may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 364 and operating system 362) and data (e.g., application data 366) for use by processing logic 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 362 may include software instructions for managing hardware and software resources of computing module 300. For example, operating system 362 may include Linux, Windows, OS X, OpenSolaris, Unix, etc. In instances in which user device 312 is a mobile phone, for example, operating system 362 may include MeeGo, Android, WebOS, iOS, Symbian, etc. Applications 364 and application data 366 may provide network services or include applications, depending on the device in which the particular computing module 300 is implemented.

In an exemplary implementation, computing module 300 may perform the operations described herein in response to processing logic 320 executing software instructions contained in a computer-readable medium, such as memory 360. A computer-readable medium may be defined as a physical or logical memory device. The software instructions may be read into memory 360 from another computer-readable medium (e.g., a hard disk drive (HDD), SSD, etc.), or from another device via communication interface 350. Alternatively, hard-wired circuitry may be used in place of or in combination with software instructions to implement processes consistent with the implementations described herein. Thus, implementations described herein are not limited to any specific combination of hardware circuitry and software.

Figure 4:
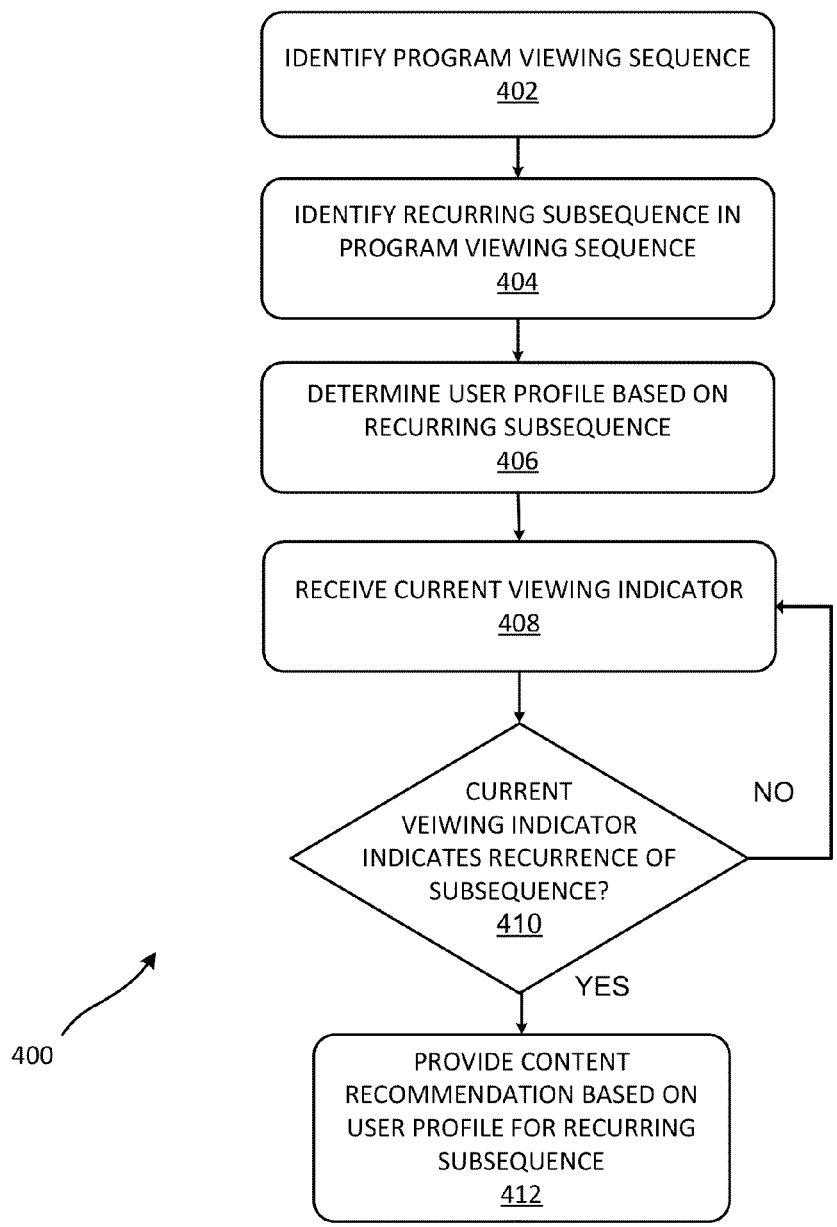
FIG. 4 is a flowchart of an exemplary process for providing a content recommendation based on matching a subsequence to a user profile.

FIG. 4 is a flowchart of an exemplary process 400 for providing a content recommendation for a user device based on matching a recurring subsequence 154 to a user profile. Exemplary TV program viewing sequences 152a-152n, and recurring subsequence 154 associated with process 400 are described in conjunction with FIG. 1C and exemplary content recommendation message 174 in FIG. 1D. Process 400 may execute in a system, for instance a content recommendation system 140 described in conjunction with FIG. 1B. It should be apparent that the process discussed below with respect to FIG. 4 represents a generalized illustration and that other elements may be added or existing elements may be removed, modified or rearranged without departing from the scope of process 400.

At block 402, program viewing sequences storage 142 may identify commands or requests corresponding to program viewing sequences 152a-152n, for instance from one or more remote controls 112 as television viewers input instructions through remote controls 112 to control TVs 104 and/or STBs 108. Program viewing sequences storage 142 may receive program viewing sequences 152a-152n for a predetermined time and from a plurality of user devices and customer premises networks 102.

At block 404, subsequence identifying module 144 may identify a recurring subsequence 154 in program viewing sequences storage 142. For example, subsequence identifying module 144 may determine a recurring subsequence by identifying programs in program viewing sequences 152a-152n based on particular vectors, such as broadcast time, genre, program type, actors, directors, channel, and/or broadcast network.

At block 406, user profile determining module 146 may determine a user profile based on recurring subsequence 154. For example, user profile determining module 146 may determine the user profile based on overlapping demographics of the programs in subsequence 154.

At block 408, current subsequence identifying module 148 may receive a current viewing indicator 160, for instance from a user device in a customer premises network 102. Current viewing indicator 160 may comprise information regarding one or more programs that have been (or are being) viewed by the television viewer using the user device.

At block 410, current subsequence identifying module 148 may determine whether current viewing indicator 160 indicates a probable recurrence of subsequence 154. For example, current subsequence identifying module 148 may receive current viewing indicator 160 and determine whether the one or more programs in current viewing indicator 160 match subsequence 154. The current subsequence identifying module 148 may determine a probable recurrence of subsequence 154 based on a past ratio of occurrence of subsequence 154 in relation to occurrence of current viewing indicator 160.

At block 412, content recommending module 150 may provide a content recommendation based on the user profile in response to an indication of the recurrence of subsequence 154. For example, content recommending module 150 may automatically provide a targeted advertisement in response to the indication of the recurrence of subsequence 154. Alternately, content recommending module 150 may provide a content recommendation message 174 that includes an option 176 to select among multiple recommended programs A-B, or to dismiss content recommendation message 174.

The foregoing description provides illustration and description, but is not intended to be exhaustive or to limit the embodiments to the precise form disclosed. Modifications and variations are possible in light of the above teachings or may be acquired from practice of the invention. For example, while user profiles have been described with respect to a TV and a single user, other user devices and different methods of determining a user profile may be used in other implementations. Further, non-dependent processes and acts may be performed in parallel and/or separately from each other.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method embodied in a non-transitory computer readable medium comprising:
    identifying at least one program viewing sequence, wherein each of the at least one program viewing sequence comprises a plurality of programs in at least one television viewing session on at least one user device;
    identifying a recurring subsequence in the at least one program viewing sequence, wherein the recurring subsequence comprises a subsequence of programs that is repeated in the at least one program viewing sequence;
    determining a user profile associated with a group of television viewers that view the recurring subsequence;
    receiving a current viewing indicator from a particular user device;
    determining whether the current viewing indicator is a sufficient predictor of the recurring subsequence based on a probability of an incidence of the current viewing indicator indicating a recurrence of the subsequence; and
    providing a content recommendation to the particular user device based on the user profile associated with the group of television viewers and in response to a determination that the current viewing indicator is a sufficient predictor of the recurring subsequence.

2. The computer-implemented method of claim 1, wherein providing the content recommendation further comprises:
    determining a plurality of content recommendation sets;
    determining a weighting factor for each of the content recommendation sets; and
    providing a weighted content recommendation as the content recommendation, wherein the weighted content recommendation is based on the weighting factor and one of the plurality of content recommendation sets.

3. The computer-implemented method of claim 2, further comprising:
    receiving a response to the weighted content recommendation;
    determining whether the response to the weighted content recommendation indicates success of the weighted content recommendation;
    incrementing the weighted factor for the weighted content recommendation in response to a determination that the response to the weighted content recommendation indicates success of the weighted content recommendation; and
    decrementing the weighted factor for the weighted content recommendation in response to a determination that the response to the weighted content recommendation does not indicate success of the weighted content recommendation.

4. The computer-implemented method of claim 1, wherein the at least one program viewing sequence comprises a plurality of program viewing sequences received from at least one of a plurality of customer premises networks or a plurality of user devices.

5. The computer-implemented method of claim 1, wherein determining the user profile based on the recurring subsequence further comprises:
    determining a demographic associated with each of the televisions viewers of the recurring subsequence; and
    determining the user profile based on a combined demographic information of all the television viewers of the subset of programs in the recurring subsequence.

6. The computer-implemented method of claim 1, wherein identifying the recurring subsequence in the at least one program viewing sequence further comprises:
    identifying each program in the at least one program viewing sequence based on at least one vector;
    identifying a subgrouping of programs that occurs in the at least one program viewing sequence for a predetermined minimum number of times based on the at least one vector; and
    identifying the subgrouping of programs that occurs in the at least one program viewing sequence for the predetermined minimum number of times as the recurring subsequence.

7. The computer-implemented method of claim 6, wherein the at least one vector comprises at least one of a broadcast time, genre, program type, program personnel, channel, or broadcast network.

8. The computer-implemented method of claim 1, wherein receiving the current viewing indicator comprises receiving at least one most recently viewed program.

9. The computer-implemented method of claim 8, further comprising:
    determining whether the at least one most recently viewed program matches at least one program in the recurring subsequence;
    determining whether the at least one most recently viewed program is a sufficient predictor of the recurring subsequence in response to a determination that the at least one most recently viewed program matches at least one program in the recurring subsequence; and
    determining that the current viewing indicator indicates the recurring subsequence in response to a determination that the at least one most recently viewed program is a sufficient predictor of the recurring subsequence.

10. The computer-implemented method of claim 1, wherein providing the content recommendation further comprises:
    determining a demographic associated with the user profile; and
    providing the content recommendation based on the demographic associated with the user profile.

11. A device comprising:
    a memory to store a plurality of instructions; and
    a processor to execute instructions in the memory to:
        identify at least one program viewing sequence, wherein each of the at least one program viewing sequence comprises a plurality of programs in at least one television viewing session on at least one user device;
        identify a recurring subsequence in the at least one program viewing sequence, wherein the recurring subsequence comprises a subsequence of programs that is repeated in the at least one program viewing sequence;
        determine a user profile associated with a group of television viewers that view the recurring subsequence;
        receive a current viewing indicator from a particular user device;
        determine whether the current viewing indicator is a sufficient predictor of the recurring subsequence based on a probability of an incidence of the current viewing indicator indicating a recurrence of the subsequence; and
        provide a content recommendation based on the user profile associated with the group of television viewers and in response to a determination that the current viewing indicator indicates the recurring subsequence.

12. The device of claim 11, wherein when providing the content recommendation, the processor is further to:
determine a plurality of content recommendation sets;
determine a weighting factor for each of the content recommendation sets; and
provide a weighted content recommendation as the content recommendation, wherein the weighted content recommendation is based on the weighting factor and one of the plurality of content recommendation sets.

13. The device of claim 12, wherein the processor is further to:
receive a response to the weighted content recommendation;
determine whether the response to the weighted content recommendation indicates success of the weighted content recommendation;
increment the weighting factor for the weighted content recommendation in response to a determination that the response to the weighted content recommendation indicates success of the weighted content recommendation; and
decrement the weighting factor for the weighted content recommendation in response to a determination that the response to the weighted content recommendation does not indicate success of the weighted content recommendation.

14. The device of claim 11, wherein the at least one program viewing sequence comprises a plurality of program viewing sequences received from at least one of a plurality of customer premises networks or a plurality of user devices.

15. The device of claim 11, wherein when determining the user profile, the processor is further to:
determine a demographic associated with the recurring subsequence; and
determine the user profile based on a combined demographic information of all television viewers of the recurring subsequence.

16. The device of claim 11, wherein when identifying the recurring subsequence in the at least one program viewing sequence, the processor is further to:
identify each program in the at least one program viewing sequence based on at least one vector;
identify a subgrouping of programs that occurs in the at least one program viewing sequence for a predetermined minimum number of times based on the at least one vector; and
identify the subgrouping of programs that occurs in the at least one program viewing sequence for the predetermined minimum number of times as the recurring subsequence.

17. The device of claim 16, wherein the at least one vector comprises at least one of a broadcast time, genre, program type, program personnel, channel, or broadcast network.

18. The device of claim 11, wherein when receiving the current viewing indicator, the processor is further to:
receive at least one most recently viewed program.

19. A non-transitory computer-readable medium including instructions to be executed by a processor, the instructions including one or more instructions, which when executed by the processor, for causing the processor to:
identify at least one program viewing sequence, wherein each of the at least one program viewing sequence comprises a plurality of programs;
identify a recurring subsequence in the at least one program viewing sequence, wherein the recurring subsequence comprises a subsequence of programs that is repeated in the at least one program viewing sequence;
determine a user profile based on the recurring subsequence;
receive a current viewing indicator from a particular user device;
determine whether the current viewing indicator is a sufficient predictor of the recurring subsequence based on a probability of an incidence of the current viewing indicator indicating a recurrence of the subsequence; and
provide a content recommendation to the particular user device based on the user profile and in response to a determination that the current viewing indicator indicates the recurrence of the subsequence.

20. The non-transitory computer-readable medium of claim 19, where the one or more instructions further includes instructions to:
determine a plurality of content recommendation sets;
determine a weighting factor for each of the content recommendation sets; and
provide a weighted content recommendation as the content recommendation,
wherein the weighted content recommendation is based on the weighting factor and one of the plurality of content recommendation sets.

* * * * *